Nov. 14, 1967

J. C. SISSON ETAL 3,353,005

BRAZING FURNACE

Filed July 6, 1965

JAMES C. SISSON
EDWARD C. SPARROW, JR.
PAUL N. ECKLES
FRED H. MEISSNER
WOODROW A. BURNHAM
INVENTORS

BY Edward J. Ansell
George J. Netter
Thomas H. Jones

ATTORNEYS

JAMES C. SISSON
EDWARD C. SPARROW, JR.
PAUL N. ECKLES
FRED H. MEISSNER
WOODROW A. BURNHAM
INVENTORS

BY

ATTORNEYS

United States Patent Office 3,353,005
Patented Nov. 14, 1967

3,353,005
BRAZING FURNACE
James C. Sisson and Edward C. Sparrow, Jr., Sacramento, Paul N. Eckles, Carmichael, Fred H. Meissner, Orangevale, and Woodrow A. Burnham, Carmichael, Calif., assignors to Aerojet-General Corporation, Azusa, Calif., a corporation of Ohio
Filed July 6, 1965, Ser. No. 469,510
10 Claims. (Cl. 219—411)

ABSTRACT OF THE DISCLOSURE

This disclosure relates to apparatus for brazing or welding the abutting ends of elongated tubular structures.

A brazing furnace according to the present disclosure comprises an annular enclosure containing an array of infrared radiating generators disposed about the inner periphery of the enclosure. An annular reflecting depression is located within the inner periphery of the enclosure, and is circumferentially formed in said periphery. The depression is located behind the generators in such a manner as to direct an annular band of radiation from said generators, which annular band is narrower than the enclosure. Articles to be joined, such as elongated tubular objects, when placed with their junction within said annular band, are subjected to an intense heat from the focused infrared radiation from the generators, and are thereby brazed together.

According to a preferred but optional embodiment of the present disclosure, heat detectors are placed within the brazing furnace so as to accurately control and adjust the radiation intensity of individual ones of the radiating generators, to thereby provide a uniform heating intensity within the annular band.

According to another preferred but optional embodiment of the present disclosure, coolant is circulated in portions of the enclosure so as to form a cool zone which acts as a heat barrier within the enclosure.

---

This invention relates to apparatus for brazing or welding the abutting ends of elongated tubular structures, and more particularly to a brazing furnace which may be clamped about the tubular structures being joined and which employs a plurality of electrical heating elements circumferentially positioned about the tubular structure and being controlled by means responsive to the temperature of the joint between the tubular structures.

Brazing or braze welding of pipe or tubing joints attemps to achieve a coalescence of metals of the ends of pipe or tubing being joined. In the prior art this has generally been accomplished by gas flame heating or induction heating of the joint.

When it becomes necessary to join together the ends of pipes in the close quarters of a submarine atmosphere, the necessarily cumbersome equipment used in the prior art becomes inconvenient to store and to use.

The torch flame equipments suffer from non-uniformity in the desired heat zone area. While induction units produce uniform zone heating, they must carry a continuous flow of coolant fluid through their coils requiring additional fittings and sources of coolant, not to speak of the coolant waste, and its disposition.

Torch brazing produces gaseous by-products which must be dissipated. Induction brazing requires high power for which, in practical applications, the power line lengths are limited to approximately fifty feet.

The above described disadvantages are even more pronounced when the pipe brazing is to be done in a submarine environment where storage (or hatch) space for the equipment is at a premium.

The present invention contemplates a novel brazing furnace in the form of a cylindrical oven, hinged so that it can be opened much in the manner of a clam-shell. Within the oven are installed an array of quartz heating lamps circumferentially positioned about the inner periphery of the housing. The furnace assembly clamps about a pipe joint to be brazed and power is applied to the lamps, thereby heating the pipe and effecting the brazing of the joint. The assembly incorporates air cooling means and automatic temperature control which is responsive to the temperature control which is responsive to the temperature of the braze joint to operate the heating lamps. The configuration of the oven is such that the work area may be observed during brazing.

While the configuration of the present invention may be applied to tubing or pipe structures of larger diameters, the application thereof described particularly herein has been made to small diameter pipes such as may be used in refrigeration systems or to pipes for other hydraulic or pneumatic systems on the order of three or so inches in diameter.

Implementations of a brazing furnace according to this invention are light weight compared to the cumbersome prior art equipments, and are readily portable so that a plumber may carry the invention much as a hand tool for brazed or leaded joints and refrigeration piping and the like installed in large buildings during the construction thereof.

Another application of the invention can be found in kilns for firing of small ceramic articles. Such kilns according to this invention would be far more flexible than fire brick kilns now used, and more economical than the latter.

Accordingly, it is an object of this invention to provide a relatively simple and lightweight furnace for coalescing the abutting ends of sections of piping being assembled together.

It is another object of this invention to provide a brazing furnace in the form of a split cylinder, the halves thereof being hinged together for easy opening and clamping of the furnace over pipe or tubing joints to be brazed.

It is a further object of this invention to provide a brazing furnace, clampable over the work, in which quartz lamps surround the work area to heat the work and braze the area under the lamps, and which includes means whereby the work area may be observed during the brazing operation.

It is still another object of this invention to provide a brazing furnace clampable over a work area in clam-shell fashion and including quartz lamp heating means directed at the work area and being controllable by temperature sensing means responsible to the work area temperature.

A still further object of this invention is to provide a furnace or oven in which a peripheral array of heating elements is located at one end of the furnace, such that the heating zone of the furnace can be positioned in juxtapositional relationship with a pipe joint which is located at a tee or elbow where there is a sharp bend in the pipe.

Another object of this invention is to provide a furnace or oven in which a peripheral array of electrically controllable heating elements is positioned at one end of the furnace while at the other end of the furnace is provided a coolant manifold which cools the electrical connectors incident to the heating elements.

It is yet another object of the invention to provide an electrically controlled oven in the form of a split cylinder, the halves of which are hinged together, and wherein an array of electrically controlled heating elements are provided disposed peripherally about the interior thereof to provide a predetermined oven temperature.

These and other objects will become more clear from the specification which follows and the appended claims taken together with the drawings wherein:

Figure 1:
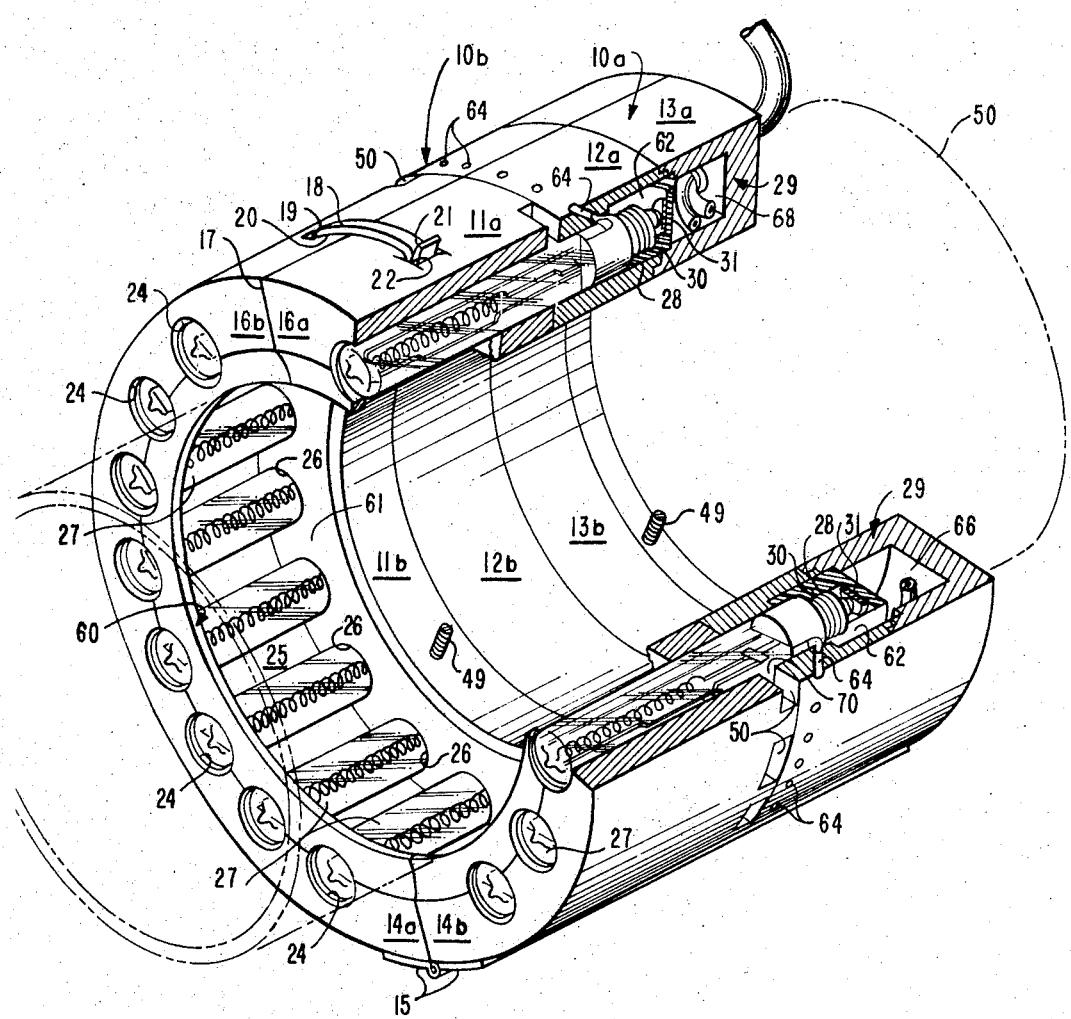
FIGURE 1 is a partially cut away perspective view of a brazing furnace according to this invention looking into the heating element end thereof.
Figure 2:
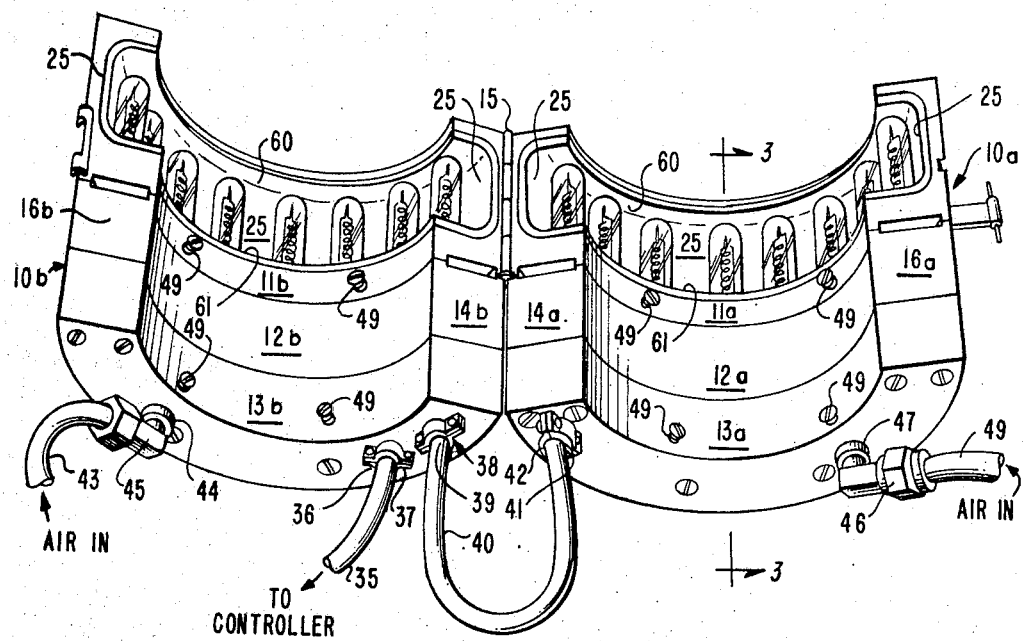
FIGURE 2 is an open perspective view of the furnace according to this invention showing the interior details thereof.

With reference to FIGURES 1 and 2 taken together, the brazing furnace according to this invention can be seen to consist of a cylindrical housing 10. The housing 10 splits into two equal half-cylinder sections 10a and 10b. Each half-cylinder section has the stacked sections 11a, 12a, 13a and 11b, 12b, 13b, respectively. The two half-cylinders 10a and 10b are attached together on the diametral edges 14a and 14b by a hinge 15 on which the two halves 10a and 10b articulate so that cylinder 10 may be opened on hinge 15 as is shown clearly in FIGURE 2 or closed as is shown clearly in FIGURES 1 and 4, the opposite diametral ends 16a and 16b coming together at 17 to complete the cylinder 10, the ends 16a and 16b being held together by a clamp 18, clamp 18 articulates on a pivot 19 in a nacelle 20 in section 11b near edge 16b of half cylinder section 10b. The crimped end 21 of clamp 18 snaps into an appropriately shaped depression 22 in section 11a near edge 16a of half cylinder 10a.

The three sections of the oven may be described as the upper section, or heat source reflective section 11a and 11b, center or heat source receptacle section 12a and 12b, and lower or wiring section 13a and 13b. This is shown in cross section in FIGURE 3.

Figure 3:
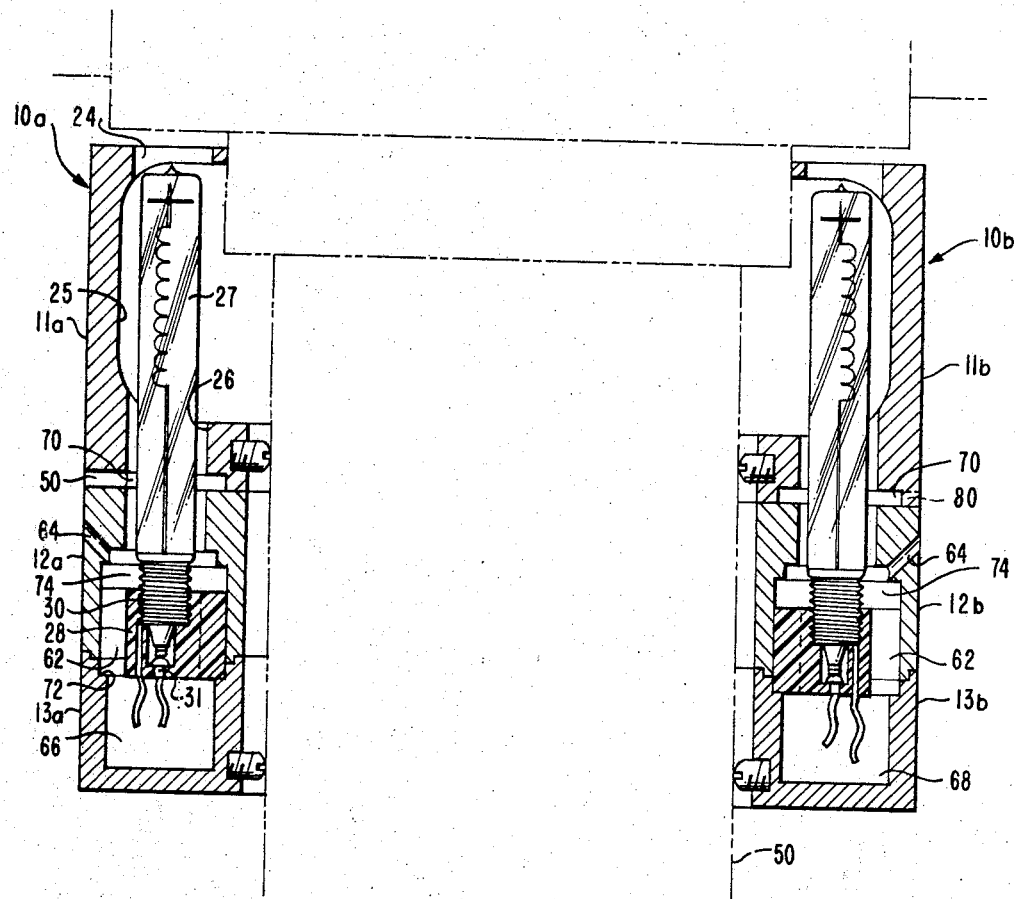
FIGURE 3 is a cross section through 3—3 of FIGURE 2 showing the placement of the furnace with respect to a pipe joint to be brazed.

It may be seen in FIGURES 1, 2 and 3 that section 11 has a series of apertures such as 24 in the top thereof uniformly spaced thereabout. The inner surface 25 of section 11 is contoured so as to form a concave ring therein. Apertures 24 open into the top of the contour of inner surface 25. In a practical embodiment of the invention this surface 25 has been coated with heat resistant and reflective ceramic or similar surface coating of a color to best reflect radiation impinging thereon and concentrate such radiation in a relatively confined area as further described below. Apertures 26 in line with apertures 24 are in the bottom of contour surface 25.

In the center section 12 are installed socket receptacles such as 28 which are made of an insulating plastic material and are shown in FIGURE 1 in the cutaway sections 29 of the oven. The socket receptacles 28 are in vertical alignment with respectively associated apertures 24 and 26 so that lamps such as 27 may be inserted into sockets such as 28 through the aligned apertures 24 and 26 in reflective contoured surface 25 in upper section 11. Sockets 28 are threaded as at 30 to receive the threaded end of heat lamps 27. A central contact 31 is positioned at the bottom of socket 28 and is insulated by the material forming the socket from the threaded portions 30 which forms the second contact of the lamps 27 inserted in socket 28.

In the open shell condition of the oven shown in FIGURE 2 it may be seen that there is an electrical connection cable 35 which enters the bottom of oven section 13b at 36 and is held in place by a clamp 37. The half sections 10a and 10b are interconnected electrically by this cable exiting from section 13b at 38 through wire loop 40 and entering section 13a at 41. Cable clamps 39 and 42 hold wire loop 40 securely and prevent abrasion as does also clamp 37 previously mentioned.

Cooling air is supplied to each half of the shell through air hoses 43 and 49 coupled into the bottom sections 13b and 13a, respectively, As seen at 44 and 47, the air hoses 43 and 49 are coupled respectively with elbow couplings 45 and 46. From elbow couplings 45 and 46 the air enters manifold sections 66 and 68 where it is conveyed to grooved passageways 62. Grooved passageways 62 conduct the air through the socket receptacles 28 in close proximity to the threaded portions 30. The socket receptacle 28 is formed as an arcuate sector such that it contains sockets for several lamps 27. The arcuate sector rests on an interior shoulder 72 and the arcuate receptacle 28 is interrupted with grooved passageways 62 which are positioned adjacent to individual threaded portions 30 to cool them.

After exiting from grooved passageways 62 the coolant air is conducted to a chamber 74. A portion of the coolant air is discharged from chamber 74 through holes 64, as shown in FIGS. 1 and 3. The remainder of the coolant air is conducted through apertures 26 and from thence to grooved manifolds 70 and 80. Each of the shell halves contains a manifold 70 or 80 which comprises an arcuately shaped groove (shown in section in FIG. 3) that connects together all of the apertures 26 for each shell half. From grooved manifolds 70 and 80 the coolant air is discharged through side ports 50. Flow of the coolant air through passage 26 into the heating zone is resisted by a thermal gradient between the heating zone and the remainder of the furnace. Because of the high heat generated in the heating zone, any gas in that region expands and has a tendency to flow through aperture 26 in the direction of manifolds 66 and 68. This tendency interposes a resistance to the flow of coolant air in the opposite direction, e.g., from the manifold through aperture 26 to the heating zone. As a result, the air exiting from manifolds 66 and 68 takes the path of least resistance and is largely discharged through holes 64 and side ports 50.

Figure 5:
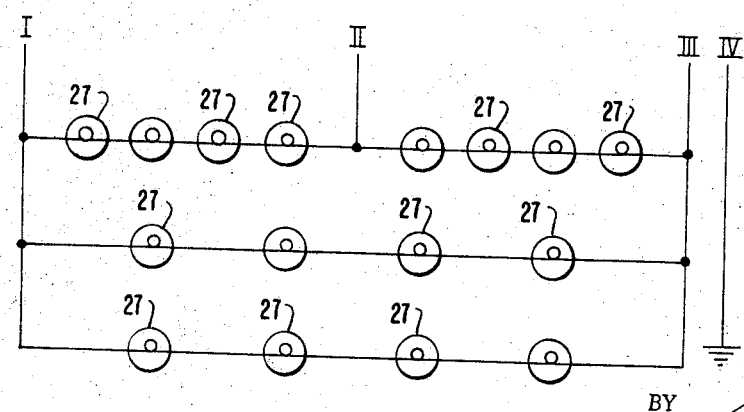
FIGURE 5 is a circuit diagram of the electrical connections of the furnace.

The electrical interconnections among the several lamps 27 are shown in FIGURE 5. They may be seen to consist of an array of series-parallel connections, known to those skilled in the art pertaining to this invention.

Within the interior of the oven 10 a series of *screws* 49 are provided. These are threaded into the inner cylinder walls of sections 11a, 11b, 13a and 13b of the oven and can be set to center a *pipe* such as 50 shown in dashed outline in FIGURE 1 within oven 10 when it is being used to braze the pipe sections. Thus when clamp 18 is pulled tightly to close the shell halves 10a and 10b over the pipe 51, it is tightly held in place by the pressure of adjustment screws 49. The pipe is thus centered in the oven area.

Figure 4:
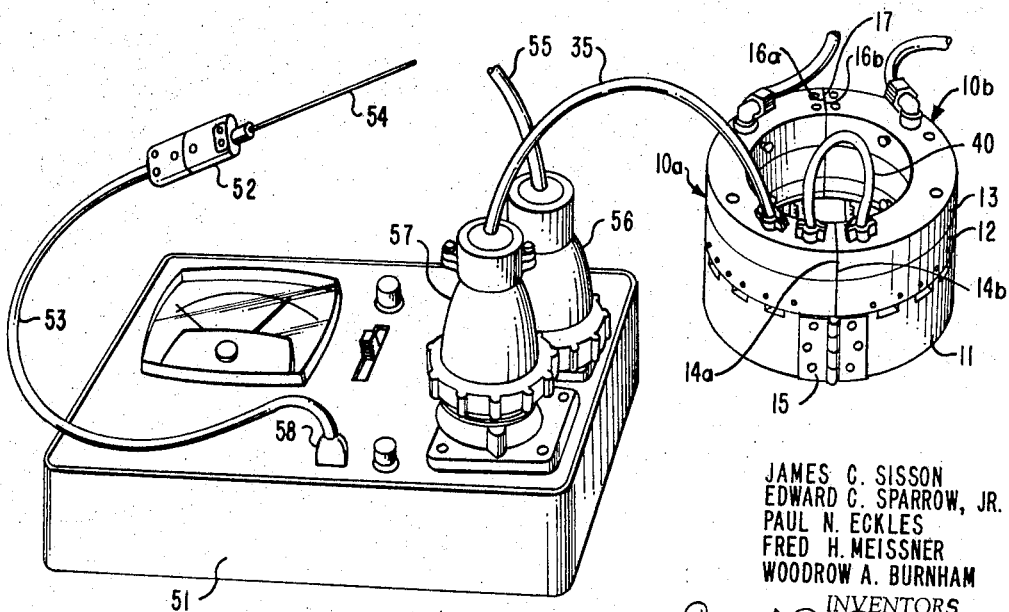
FIGURE 4 is a perspective view from the cable end of a furnace according to this invention showing in addition a temperature sensing indicating and controlling unit for use therewith.

As may be seen in FIGURE 4 the oven 10 is generally used with a temperature controller 51. The temperature controller provides power to the oven derived from an external source connected with a cable 55 through a plug 56 to the controller 51. The power is provided to the oven through cable 35, previously mentioned, which is connected to the controller through a plug 57.

On a cable 53, coupled to controller 51 at a plug 58, a temperature sensor assembly 52 having a Chromel/Alumel temperature probe and thermocouple 54 thereon, is inserted into the heating area of the oven 10 when in use to sense the temperature of the pipe braze area and to adjust the power supplied to the lamps 27 in appropriate combinations, as necessary to successfully coalesce the abutting sections of pipe being joined.

The operation of this invention can be seen from the several figures to be such that the oven 10 splitting into half cylinder sections 10a and 10b articulating on hinge 15 can be opened readily and positioned over a pair of pipe sections such as 50 to be joined by coalescence of the joined ends in a braze weld. The half-cylinder sections 10a and 10b when placed about the pipe sections 50 to be joined are clamped tightly together by clamp 18 and centered about pipe 50 by the setting of screws 49 on the interior walls of sections 10a and 10b.

The inner walls of sections 10a and 10b near the top thereof in sections 11a and 11b have a contour in the form of a concave surface 25 therein which may be coated with a heat resistant ceramic or other heat resistant surface of relatively high reflectivity for infra-red radiation. The concavity has a top surface 60 in which apertures 24 are positioned uniformly therein and a lower surface 61 in which apertures 26 are positioned vertically aligned with corresponding apertures 24. Apertures 26 lead into socket receptacles 28 for infra-red lamps 27 which may be inserted in such sockets 28 with the radiating portions of lamps 27 positioned within the area of concavity of the contour 25 in the inner wall of housing 10.

Electrical wiring connections are made to the terminals 30, 31 of sockets 28 in a predetermined arrangement of the circuit as shown in FIGURE 5 to provide a distribution of the heat radiated by lamps 27 when excited by electric current applied to the contacts 30, 31 in sockets 28 through cables 35 and 40. The cable 35 is connected to a control unit 51 which in turn is connected to a source of electric power. A temperature sensing unit 52 with probe 54 can be inserted into the area in the annular radiation beam of lamps 27 created by the reflecting action of contoured area 25 to sense the temperature of pipe being welded. The control unit 51 can be set to maintain a predetermined temperature at which the braze-welding of the pipe is best accomplished.

The lamps 27 may be of the quartz iodide type or other high temperature radiating lamp or infra-red generating lamp suitable for the purpose as would be known to those skilled in the art.

While but a single preferred embodiment of this invention has been shown in the drawings and described above, it should be clear to those skilled in the art appertaining hereto that a number of other configurations other than circular are possible to achieve the brazing action in a brazing furnace according to this invention and therefore it should be clearly understood that the invention is not to be construed as limited to the circular configuration or other specific details shown and described hereinabove. Variations within the ambit of the appended claims may occur to others skilled in the art.

What is claimed is:

1. A brazing furnace comprising:
   a hinged pair of similar half-cylinders forming, when closed, an annular enclosure;
   an array of uniformly spaced infra-red radiating generators disposed about the inner periphery of said annular enclosure; and
   an annular reflecting depression in the inner periphery of said annular enclosure, said depression being circumferentially formed in said inner periphery and located therein with respect to said generators so as to direct the radiation from said generators in an annular band within said annular enclosure, said annular band being narrower than said annular enclosure,
   whereby when articles are placed centrally inside said enclosure, the areas of said article within said annular band are subjected to an intense heat from the reflected infra-red radiation from said generators.

2. In the brazing furnace defined in claim 1, adjustable means within said annular enclosure, said adjustable means being settable for contact with articles placed centrally inside said annular enclosure to maintain said articles in the center of said annular enclosure.

3. In combination with the brazing furnace defined in claim 1, a controller interconnected with said infra-red radiating generators for adjusting the radiation intensity of individual ones of radiating generators in said array to provide uniform heating intensity to said article within said annular band.

4. A brazing furnace comprising:
   annular heat generating means disposed clampably about the abutting ends of a pair of pipe ends to be brazed together;
   a plurality of infra-red heat-generator lamps uniformly disposed in a circular array within said annular heat generating means; and
   reflecting means circumferentially disposed in said heat generating means behind said infra-red heat-generator lamps in relation to said abutting pipe ends to concentrate the radiation from said lamps in a circumferential annular band uniformly upon said abutting pipe ends, said annular band being narrower than said heat generating means,
   whereby said abutting pipe ends are heated to a temperature at which said ends are coalesced together in a uniform and tightly fused leak-proof weld.

5. The brazing furnace defined in claim 4 combined with a controller, said controller including heat sensing means insertable within said heat generating means at said pipe ends, and being electrically interconnected with said lamps to control the relative intensity of said lamps in response to temperatures sensed by said sensing means so as to provide uniform heating of said abutting pipe ends at all points thereabout.

6. A brazing furnace comprising a split cylinder forming a pair of half-cylinders;
   said half cylinders being hinged together on a hinge member and being articulatable thereon;
   a clamp means disposed on the free ends of said half cylinders and being adapted to hold the free ends of said half cylinders together when said half cylinders are closed together as said split cylinder;
   a plurality of socket receptacles uniformly disposed within said half cylinders and electrically interconnected in a predetermined circuit configuration, and connected to an external source of controlled electric current;
   an annular contour cut into the interior circumference of said split cylinder adjacent said receptacles to form a concave reflector for radiation; and
   a plurality of infra-red heating lamps arrayed in a uniform spacing in said receptacles about the inside of said cylinders,
   whereby when said cylinder is positioned about a pair of abutting pipe ends to be brazed together and clamped thereon, and said electric current applied to said lamps from said source, the radiation from said lamps is directed by said reflector to said abutting pipe ends to braze and thereby coalesce said pipe ends together.

7. A brazing furnace comprising:
   a housing clampable over an article to be braze-welded and adapted to enclose the components of the article to be braze-welded;
   an array of infra-red radiating elements disposed about the inner periphery of said housing;
   a reflecting depression in said inner periphery of said housing behind said radiating elements and arranged to direct the radiation from said elements in an annular band surrounding said article to be braze-welded in the desired area of said article to be braze-welded, said annular band being narrower than said inner periphery.

8. In combination with the brazing furnace defined in claim 7, an electrical control system comprising means for detecting the temperature of said article to be braze-welded; means for controlling the intensity of radiation of said radiating elements, said last means being interconnected between said means for detecting the temperature of said article, said radiating elements and an external source of electric power; and means for setting the temperature levels at which said means for controlling the intensity of radiation will maintain said intensity in response to the temperature sensed by said means for detecting temperature.

9. A brazing furnace comprising:

a housing clampable over an article to be braze-welded and adapted to enclose the components of the article to be braze-welded;

an array of infra-red radiating elements situated at one end of said housing and disposed about the inner periphery of said housing;

a reflecting depression in the inner walls of said housing behind said radiating elements;

a first manifold situated at the opposite end of said housing from said radiating elements;

a second manifold in said housing and positioned intermediate said first manifold and said radiating elements; and passageways from said first manifold passing in close relationship to the socket ends of said radiating elements and connecting to said second manifold, whereby coolant under a positive pressure may be caused to cool the socket ends of said radiating elements and to form a cool zone within said second manifold which acts as a heat barrier between the end of said housing containing said radiating elements and the remainder of said housing.

10. The brazing furnace of claim 9 wherein said housing comprises a hinged pair of similar half-cylinders forming, when closed, an annular enclosure.

References Cited

UNITED STATES PATENTS

| | | | |
|---|---|---|---|
| 2,611,848 | 9/1952 | Smith | 219—59 |
| 2,633,522 | 3/1953 | Berg et al. | 65—269 |
| 2,677,746 | 5/1954 | Duch et al. | 219—161 X |
| 3,007,022 | 10/1961 | Jackson et al. | 219—161 X |
| 3,114,822 | 12/1963 | Boland | 219—395 |
| 3,120,138 | 2/1964 | Ronay | 228—44 |
| 3,139,745 | 7/1964 | Sievers et al. | 219—347 X |
| 3,240,915 | 3/1966 | Carter et al. | 219—343 |

RICHARD M. WOOD, *Primary Examiner.*

C. L. ALBRITTON, *Assistant Examiner.*